United States Patent
Nishiguchi et al.

(10) Patent No.: US 12,331,176 B2
(45) Date of Patent: Jun. 17, 2025

(54) METHOD FOR PRODUCING PREPREG AND METHOD FOR MOLDING COMPOSITE MATERIAL

(71) Applicant: MITSUBISHI HEAVY INDUSTRIES AERO ENGINES, LTD., Aichi (JP)

(72) Inventors: Kiichi Nishiguchi, Tokyo (JP); Hiromichi Akiyama, Tokyo (JP)

(73) Assignee: MITSUBISHI HEAVY INDUSTRIES AERO ENGINES, LTD., Komaki (JP)

( * ) Notice: Subject to any disclaimer, the term of this patent is extended or adjusted under 35 U.S.C. 154(b) by 0 days.

(21) Appl. No.: 18/018,627

(22) PCT Filed: Sep. 10, 2021

(86) PCT No.: PCT/JP2021/033295
§ 371 (c)(1),
(2) Date: Jan. 30, 2023

(87) PCT Pub. No.: WO2022/059613
PCT Pub. Date: Mar. 24, 2022

(65) Prior Publication Data
US 2023/0312850 A1    Oct. 5, 2023

(30) Foreign Application Priority Data
Sep. 17, 2020 (JP) ................ 2020-156244

(51) Int. Cl.
*C08J 5/24* (2006.01)

(52) U.S. Cl.
CPC ............. *C08J 5/24* (2013.01); *C08J 2300/00* (2013.01)

(58) Field of Classification Search
CPC .............................. C08H 5/24; C08J 2300/00
See application file for complete search history.

(56) References Cited

U.S. PATENT DOCUMENTS

| 4,098,943 A | 7/1978 | Degginger et al. |
| 2010/0092770 A1 | 4/2010 | Wadahara et al. |

(Continued)

FOREIGN PATENT DOCUMENTS

| JP | S5240588 | * | 3/1977 | ............... B32B 5/00 |
| JP | S5240588 A | | 3/1977 | |

(Continued)

OTHER PUBLICATIONS

JPS5240588 English translation prepared Sep. 19, 2024 (Year: 2024).*

(Continued)

*Primary Examiner* — Christopher M Rodd
*Assistant Examiner* — Shibin Liang
(74) *Attorney, Agent, or Firm* — HAUPTMAN HAM, LLP

(57) ABSTRACT

A method for producing a prepreg in which a reinforcing fiber base material is impregnated with a resin to produce a prepreg, wherein said method comprises: a step for preparing a first resin, which is the resin containing a filler, and a second resin, which is the resin not containing a filler; a step for arranging the second resin adjacent to the reinforcing fiber base material; a step for arranging the first resin adjacent to the reinforcing fiber base material and/or the second resin; and a step for impregnating the reinforcing fiber base material with the resin of the first resin and the second resin.

4 Claims, 5 Drawing Sheets

(56) References Cited

U.S. PATENT DOCUMENTS

2012/0141763 A1    6/2012    Cawse et al.
2013/0105200 A1    5/2013    Ohigashi et al.

FOREIGN PATENT DOCUMENTS

| | | | | |
|---|---|---|---|---|
| JP | S63170427 A | | 7/1988 | |
| JP | H04239034 A | | 8/1992 | |
| JP | 2009127013 | * | 6/2009 | ................ C08J 5/24 |
| JP | 2009127013 A | | 6/2009 | |
| JP | 2010260990 | * | 11/2010 | ................ C08J 5/24 |
| JP | 2010260990 A | | 11/2010 | |
| JP | 2013503930 A | | 2/2013 | |
| JP | 2016204522 A | | 12/2016 | |
| WO | 2008038591 A1 | | 4/2008 | |
| WO | 2012002434 A1 | | 1/2012 | |
| WO | 2013128841 A1 | | 9/2013 | |

OTHER PUBLICATIONS

JP2009127013 English translation prepared Sep. 19, 2024 (Year: 2024).*
JP2010260990 English translation prepared Sep. 19, 2024 (Year: 2024).*
International Search Report and Written Opinion of International Search Report PCT/JP2021/033295 mailed Nov. 22, 2021; 13pp.

* cited by examiner

METHOD FOR PRODUCING PREPREG AND METHOD FOR MOLDING COMPOSITE MATERIAL

RELATED APPLICATIONS

The present application is a National Phase of International Application Number PCT/JP2021/033295, filed Sep. 10, 2021, and claims priority of Japanese Application Number 2020-156244 filed Sep. 17, 2020.

TECHNICAL FIELD

The present disclosure relates to a method for producing a prepreg and a method for molding a composite material.

BACKGROUND ART

In the related art, a method for producing a fiber-reinforced prepreg is known (for example, refer to Patent Document 1). According to this production method, the prepreg is produced by adjusting a mixed product of a base resin and a fine particle formed of a resin, and thereafter, by combining the mixed product with a reinforcing fiber formed of a long fiber. Specifically, according to this production method, a resin film formed of the fine particle and the base resin are overlapped with each other on both surfaces of the reinforcing fiber, and these are heated and pressurized to transfer the resin so that the reinforcing fiber is impregnated with the resin.

CITATION LIST

Patent Literature

[PTL 1] Japanese Unexamined Patent Application Publication No. S63-170427

SUMMARY OF INVENTION

Technical Problem

Incidentally, when a composite material obtained by molding the prepreg is provided with a predetermined function, a filler may be added to the resin of the prepreg in some cases. When a large amount of the filler is mixed with the resin, viscosity of the resin increases during heating, and fluidity decreases. Consequently, the reinforcing fiber is unlikely to be impregnated with the resin. When the reinforcing fiber is unlikely to be impregnated with the resin, a void remains inside the prepreg. Therefore, there is a possibility that a molding defect such as the void may occur in the composite material molded by using the prepreg.

Therefore, an object of the present disclosure is to provide a method for producing a prepreg and a method for molding a composite material, in which a reinforcing fiber preform can be preferably impregnated with a resin containing a filler.

Solution to Problem

According to the present disclosure, there is provided a method for producing a prepreg in which a prepreg is produced by impregnating a reinforcing fiber preform with a resin. The method includes a step of preparing a first resin which is the resin containing a filler, and a second resin which is the resin without containing the filler, a step of disposing the second resin to be adjacent to the reinforcing fiber preform, a step of disposing the first resin to be adjacent to at least one of the reinforcing fiber preform and the second resin, and a step of impregnating the reinforcing fiber preform with the first resin and the second resin.

According to the present disclosure, there is provided a method for molding a composite material in which a composite material is molded by using the prepreg produced by the above-described method for producing a prepreg. The method includes a step of laminating the prepreg, a step of integrating the laminated prepregs into a laminate, a step of carbonizing the laminate, and a step of impregnating the carbonized laminate with molten silicon to mold the composite material.

Advantageous Effects of Invention

According to the present disclosure, the reinforcing fiber preform can be preferably impregnated with the resin containing the filler.

DESCRIPTION OF EMBODIMENTS

Hereinafter, embodiments according to the present disclosure will be described in detail with reference to the drawings. The present invention is not limited by the embodiments. In addition, configuration elements in the following embodiments include those which can be easily replaced by those skilled in the art, or those which are substantially the same. In addition, the configuration elements described below can be appropriately combined with each other, and when there are a plurality of the embodiments, the embodiments can be combined with each other.

Embodiment 1

A method for producing a prepreg 10 according to Embodiment 1 is a method for producing the prepreg 10 by impregnating a reinforcing fiber sheet (reinforcing fiber preform) 15 with a resin. In addition, the method for producing the prepreg 10 of Embodiment 1 is a method for producing the prepreg 10 provided with a predetermined function. The predetermined function is a function in which the resin contained in the prepreg 10 shows a carbonization reaction during sintering of the prepreg 10. The predetermined function is not limited to the above-described function, and may be another function.

(Method for Producing Prepreg)

Figure 1:
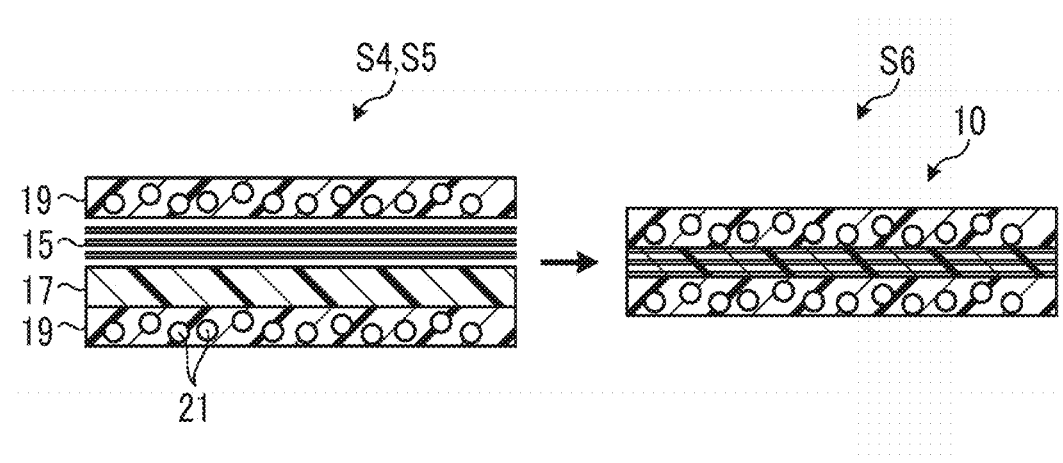
FIG. 1 is a schematic view relating to a method for producing a prepreg according to Embodiment 1.
Figure 2:
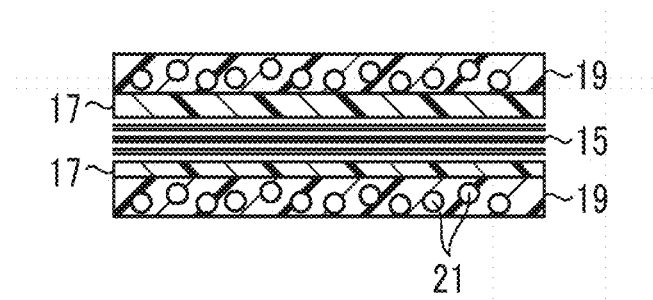
FIG. 2 is a schematic view relating to another prepreg according to Embodiment 1.
Figure 3:
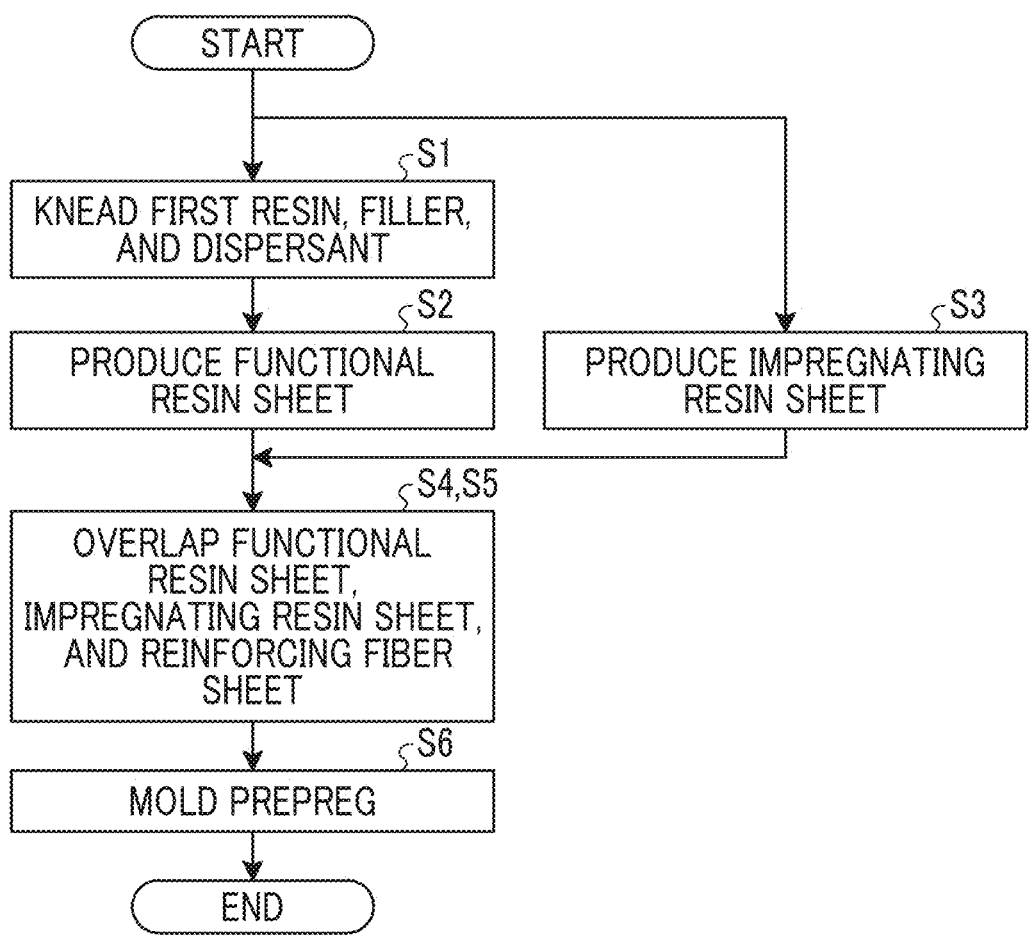
FIG. 3 is a flowchart relating to the method for producing the prepreg according to Embodiment 1.

FIG. 1 is a schematic view relating to a method for producing the prepreg according to Embodiment 1. FIG. 2 is a schematic view relating to another prepreg according to Embodiment 1. FIG. 3 is a flowchart relating to the method for producing the prepreg according to Embodiment 1. In the method for producing the prepreg 10 of Embodiment 1, the reinforcing fiber sheet 15, a impregnating resin sheet 17, and a functional resin sheet 19 are used.

The reinforcing fiber sheet 15 is formed in such a manner that a reinforcing fiber is formed in a sheet shape. The reinforcing fiber sheet 15 may be a unidirectional material whose fiber directions are aligned in one direction, or may be a woven fabric or a non-woven fabric, and is not particularly limited. In addition, the reinforcing fiber may be any fiber such as a carbon fiber, a glass fiber, and an aramid fiber, and is not particularly limited.

The impregnating resin sheet 17 is formed in such a manner that a second resin impregnating the reinforcing fiber sheet 15 is formed in a sheet shape. The impregnating resin sheet 17 is disposed adjacent to the reinforcing fiber sheet 15 in a thickness direction. The impregnating resin sheet 17 is disposed to overlap at least one side of the reinforcing fiber sheet 15. That is, the impregnating resin sheet 17 may overlap one side of the reinforcing fiber sheet 15 in the thickness direction as illustrated in FIG. 1, or may overlap both sides of the reinforcing fiber sheet 15 in the thickness direction as illustrated in FIG. 2.

The functional resin sheet 19 is configured in such a manner that a first resin in which the prepreg 10 is provided with a predetermined function is formed in a sheet shape. A filler 21 is added to the first resin. For example, in a case of the prepreg 10 serving as a precursor for producing a ceramic composite material, silicon carbide (SiC) powder or carbon (C) powder is applied to the filler 21. In addition, in a case of the prepreg 10 for producing a flame-retardant composite material, aluminum hydroxide ($Al(OH)^3$) powder is applied to the filler 21. In addition, a dispersant may be added to the first resin.

The functional resin sheet 19 is disposed adjacent to at least one of the reinforcing fiber sheet 15 and the impregnating resin sheet 17. In Embodiment 1, the functional resin sheets 19 are disposed on both sides of the reinforcing fiber sheet 15 and the impregnating resin sheet 17 which are disposed adjacent to each other. That is, a pair of the functional resin sheets 19 is prepared, and the reinforcing fiber sheet 15 and the impregnating resin sheet 17 are pinched and disposed between the pair of functional resin sheets 19.

Here, the first resin of the functional resin sheet 19 and the second resin of the impregnating resin sheet 17 will be described. The first resin and the second resin are different resins. Specifically, the first resin is a resin which shows a carbonization reaction. Therefore, the first resin is subjected to carbonization treatment such as burn-off treatment. In this manner, a degree of carbonization is properly adjusted. The first resin is disposed on an outer side in the prepreg 10. Accordingly, the prepreg 10 fulfils a function of the first resin on the outer side.

Next, a method for producing the prepreg 10 will be described with reference to FIG. 3. As a method for producing the prepreg 10, for example, a hot melt film method is used. In the hot melt film method, the reinforcing fiber sheet 15 is pinched between resin sheets. A temperature and a pressure are raised to a temperature at which the resin is softened. In this manner, the reinforcing fiber sheet 15 is impregnated with the resin. The method for producing the prepreg 10 is not particularly limited to the hot melt film method.

In the method for producing the prepreg 10, first, a step of preparing the reinforcing fiber sheet 15, the impregnating resin sheet 17, and the functional resin sheet 19 is performed. Specifically, in this step, the impregnating resin sheet 17 produced in advance and the functional resin sheet 19 produced in advance are prepared. In producing the functional resin sheet 19, first, the first resin, the filler 21, and the dispersant are kneaded to generate a functional resin (Step S1). Thereafter, the functional resin sheet 19 is produced by molding the functional resin in a sheet shape (Step S2). In addition, in producing the impregnating resin sheet 17, first, the second resin is prepared as the impregnating resin, and the impregnating resin is molded in the sheet shape, thereby producing the impregnating resin sheet 17 (Step S3).

Subsequently, in the method for producing the prepreg 10, the impregnating resin sheet 17 is disposed adjacent to the reinforcing fiber sheet 15 (Step S4). In Step S4, as illustrated in FIG. 1, the impregnating resin sheet 17 is overlapped with one side of the reinforcing fiber sheet 15 in the thickness direction. In Step S4, as illustrated in FIG. 2, the impregnating resin sheet 17 may be overlapped with both sides of the reinforcing fiber sheet 15 in the thickness direction. In this case, the thickness may be reduced (for example, by half), compared to a case where the impregnating resin sheet 17 is disposed on one side.

Subsequently, in the method for producing the prepreg 10, the pair of functional resin sheets 19 is disposed so that the reinforcing fiber sheet 15 and the impregnating resin sheet 17 are pinched between the pair of functional resin sheets 19 (Step S5). In Step S5, as illustrated in FIGS. 1 and 2, one of the pair of functional resin sheets 19 is disposed adjacent to the outer side of the reinforcing fiber sheet 15 in the thickness direction, and the other of the pair of functional resin sheets 19 is disposed adjacent to the outer side of the impregnating resin sheet 17 in the thickness direction.

Thereafter, in the method for producing the prepreg 10, after the various sheets 15, 17, and 19 are disposed as illustrated in FIG. 1 or 2, the impregnating resin sheet 17 and the functional resin sheet 19 are melted through heating and pressurizing from both outer sides of the pair of functional resin sheets 19 (Step S6). In Step S6, the prepreg 10 is produced by impregnating the reinforcing fiber sheet 15 with the second resin of the melted impregnating resin sheet 17 and the first resin of the melted functional resin sheet 19.

Embodiment 2

Figure 4:
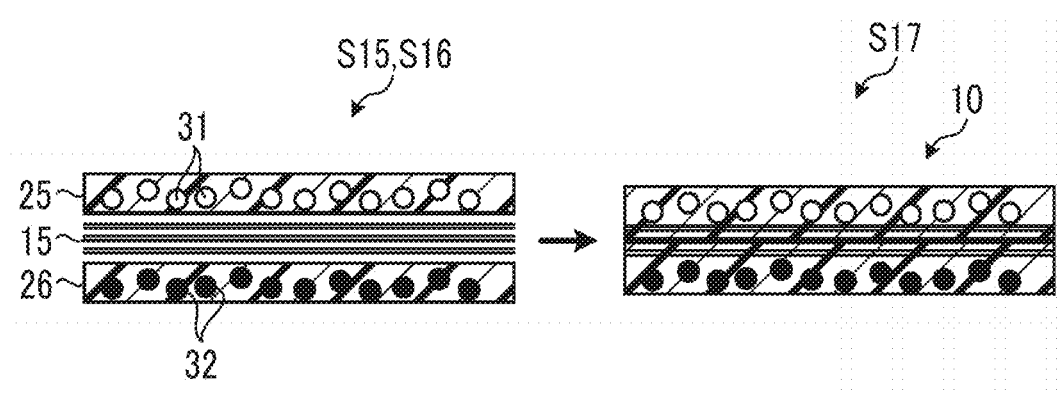
FIG. 4 is a schematic view relating to a method for producing a prepreg according to Embodiment 2.
Figure 5:
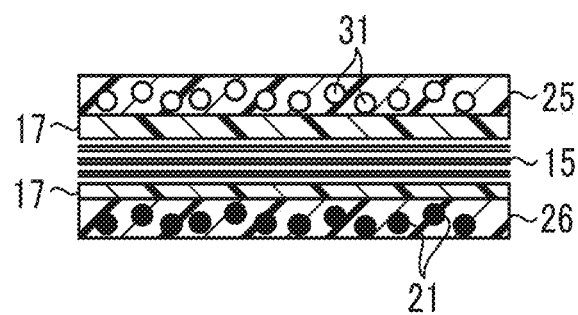
FIG. 5 is a schematic view relating to another prepreg according to Embodiment 2.
Figure 6:
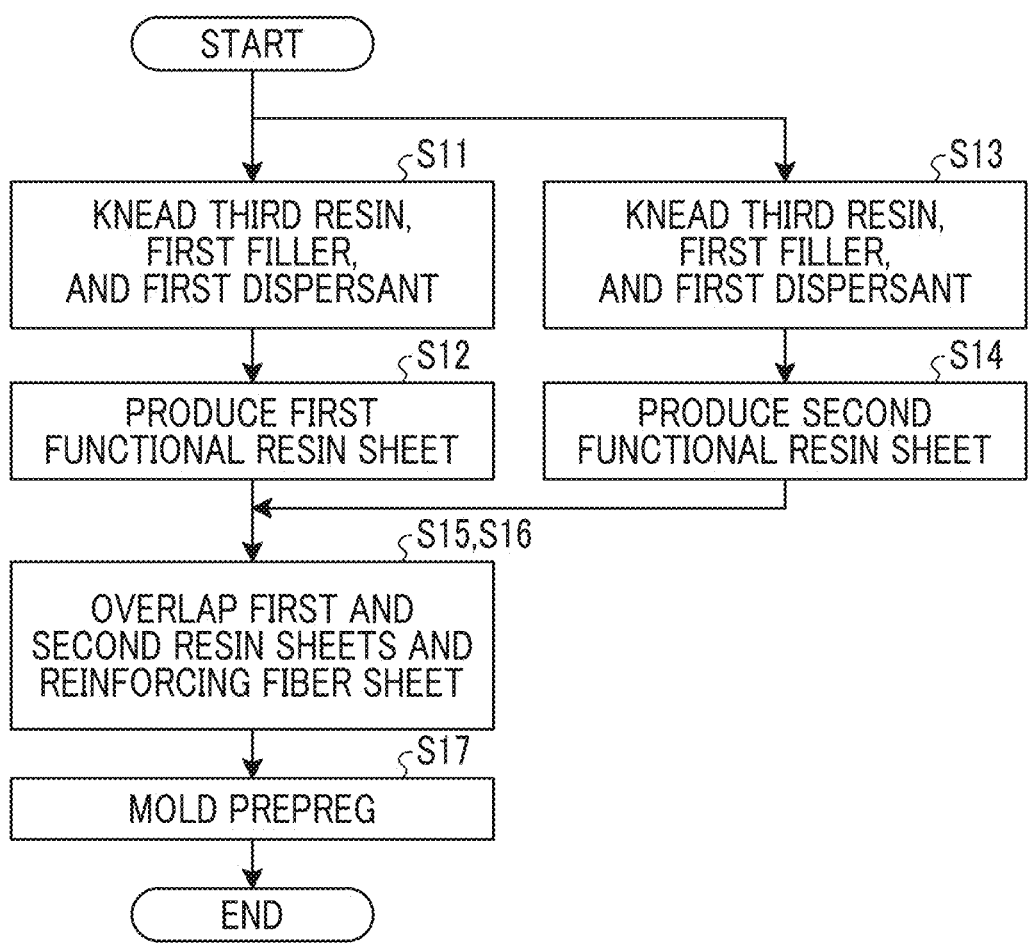
FIG. 6 is a flowchart relating to a method for producing the prepreg according to Embodiment 2.

Next, a method for producing the prepreg 10 according to Embodiment 2 will be described with reference to FIGS. 4 to 6. In Embodiment 2, in order to avoid repeated description, elements different from those in Embodiment 1 will be described, and description will be made by assigning the same reference numerals to elements having configurations the same as those in Embodiment 1. FIG. 4 is a schematic view relating to the method for producing the prepreg according to Embodiment 2. FIG. 5 is a schematic view relating to another prepreg according to Embodiment 2. FIG. 6 is a flowchart relating to the method for producing the prepreg according to Embodiment 2.

(Method for Producing Prepreg)

In the method for producing the prepreg 10 of Embodiment 2, the reinforcing fiber sheet 15, a first functional resin sheet 25, and a second functional resin sheet 26 are used. Since the reinforcing fiber sheet 15 is the same as that in Embodiment 1, description thereof will be omitted.

The first functional resin sheet 25 is configured in such a manner that a third resin in which the prepreg 10 is provided with a predetermined function is formed in a sheet shape. A first filler 31 and a first dispersant are added to the third resin. The first filler 31 is the same as the filler of Embodiment 1, but has a different type from a second filler 32 (to be described later). The first dispersant is a dispersant suitable for the third resin to which the first filler 31 is added. Therefore, the reinforcing fiber sheet 15 is easily impregnated with the third resin of the first functional resin sheet 25.

The second functional resin sheet 26 is configured in such a manner that a fourth resin in which the prepreg 10 is provided with a predetermined function is formed in a sheet shape. The second filler 32 and a second dispersant are added to the fourth resin. The second filler 32 is the same as the filler of Embodiment 1, but has a different type from the first filler 31. The second dispersant is a dispersant suitable for the fourth resin to which the second filler 32 is added. Therefore, the fourth resin of the second functional resin sheet 26 also easily impregnates the reinforcing fiber sheet 15 in the same manner as the third resin. Therefore, the first functional resin sheet 25 and the second functional resin sheet 26 can have different functions or the same functions but different performances.

Here, the first functional resin sheet 25 is disposed adjacent to one side of the reinforcing fiber sheet 15. In addition, the second functional resin sheet 26 is disposed adjacent to the other side of the reinforcing fiber sheet 15. That is, the second functional resin sheet 26 is provided on a side opposite to the first functional resin sheet 25 across the reinforcing fiber sheet 15. Therefore, the reinforcing fiber sheet 15 is pinched and disposed between the first functional resin sheet 25 and the second functional resin sheet 26.

Here, the third resin of the first functional resin sheet 25 and the fourth resin of the second functional resin sheet 26 will be described. The third resin and the fourth resin are the same resin. For example, the third resin and the fourth resin are the same resins as those in Embodiment 1. The third resin and the fourth resin are disposed on the outer side in the prepreg 10. Accordingly, the prepreg 10 fulfills functions of the third resin and the fourth resin on the outer side.

Next, a method for producing the prepreg 10 will be described with reference to FIG. 6. As the method for producing the prepreg 10, a sheet to be overlapped with the reinforcing fiber sheet 15 is different from that in Embodiment 1.

In the method for producing the prepreg 10, first, a step of preparing the reinforcing fiber sheet 15, the first functional resin sheet 25, and the second functional resin sheet 26 is performed. Specifically, in this step, the first functional resin sheet 25 produced in advance and the second functional resin sheet 26 produced in advance are prepared. In producing the first functional resin sheet 25, first, the third resin, the first filler 31, and the first dispersant are kneaded to generate a first functional resin (Step S11). Thereafter, the first functional resin sheet 25 is produced by molding the first functional resin in a sheet shape (Step S12). In addition, in producing the second functional resin sheet 26, first, the fourth resin, the second filler 32, and the second dispersant are kneaded to generate a second functional resin (Step S13). Thereafter, the second functional resin sheet 26 is produced by molding the second functional resin in a sheet shape (Step S14).

Subsequently, in the method for producing the prepreg 10, the first functional resin sheet 25 is disposed adjacent to one side of the reinforcing fiber sheet 15 (Step S15). In Step S15, as illustrated in FIG. 4, the first functional resin sheet 25 is overlapped with one side of the reinforcing fiber sheet 15 in the thickness direction. In addition, in the method for producing the prepreg 10, the second functional resin sheet 26 is disposed adjacent to the other side of the reinforcing fiber sheet 15 (Step S16). In Step S16, as illustrated in FIG. 4, the second functional resin sheet 26 is disposed on a side opposite to the first functional resin sheet 25 across the reinforcing fiber sheet 15, and is overlapped with one side of the reinforcing fiber sheet 15 in the thickness direction. In this manner, the first functional resin sheet 25 and the second functional resin sheet 26 are disposed to pinch the reinforcing fiber sheet 15 between the first functional resin sheet 25 and the second functional resin sheet 26.

Thereafter, in the method for producing the prepreg 10, after the various sheets 15, 25, and 26 are disposed as illustrated in FIG. 4, the first functional resin sheet 25 and the second functional resin sheet 26 are melted through heating and pressurizing from both outer sides of the first functional resin sheet 25 and the second functional resin sheet 26 (Step S17). In Step S17, the prepreg 10 is produced by impregnating the reinforcing fiber sheet 15 with the third resin of the melted first functional resin sheet 25 and the fourth resin of the melted second functional resin sheet 26.

As illustrated in FIG. 5, in the method for producing the prepreg 10 of Embodiment 2, the impregnating resin sheet 17 of Embodiment 1 may be further used. The impregnating resin sheet 17 is disposed adjacent to the reinforcing fiber sheet 15 in a thickness direction. For example, as illustrated in FIG. 5, the impregnating resin sheets 17 may be overlapped with both sides of the reinforcing fiber sheet 15 in the thickness direction.

(Method for Molding Composite Material)

Figure 7:
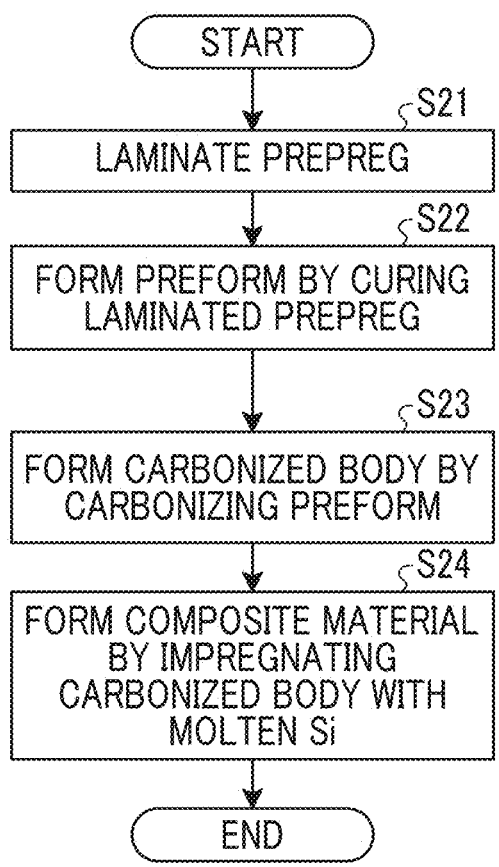
FIG. 7 is a flowchart relating to a method for producing a composite material.

Next, a method for molding the composite material will be described with reference to FIG. 7. In the method for molding the composite material, the prepreg 10 produced in Embodiment 1 or Embodiment 2 is used. FIG. 7 is a flowchart relating to the method for producing the composite material.

As illustrated in FIG. 7, in the method for molding the composite material, first, Step S21 of laminating the produced prepregs 10 in the thickness direction is performed. Thereafter, Step S22 of integrating the laminated prepregs 10 to form a laminate (preform) is performed. In Step S22, the resins contained in the laminated prepregs 10 are integrated by curing. When the resin is a thermosetting resin, the prepregs 10 are thermally cured by heating. Subsequently, in the method for molding the composite material, Step S23 of carbonizing the laminate is performed. In Step S23, carbonization treatment is performed by performing burn-off treatment in which the laminate is carbonized by blowing off a volatile component contained in the laminate. Through this carbonization treatment, a large number of pores are formed in a carbonized body which is a carbonized laminate. In the method for molding the composite material, Step S24 of impregnating the carbonized body which is a porous body with molten silicon to mold the composite material is performed. In Step S24, the molten silicon Si is impregnated with the carbonized body to fill a large number of the pores of the carbonized body with the silicon. In the method for molding the composite material, after Step S24 is performed, molding of the composite material is completed.

As described above, the method for producing the prepreg 10 and the method for molding the composite material according to the present embodiment are understood as follows, for example.

According to a first aspect, there is provided the method for producing the prepreg 10 in which the prepreg 10 is produced by impregnating the reinforcing fiber preform (reinforcing fiber sheet 15) with a resin. The method includes a step of preparing the first resin which is the resin containing the filler 21 and the second resin which is the resin without containing the filler 21 (Steps S1 to S3), a step of disposing the second resin to be adjacent to the reinforcing fiber preform (Step S4), a step of disposing the first resin to be adjacent to at least one of the reinforcing fiber preform and the second resin (Step S5), and a step of impregnating the reinforcing fiber preform with the second resin (Step S6).

According to this configuration, the reinforcing fiber preform can be more easily impregnated with the second resin without containing the filler 21, compared to the first resin containing the filler 21. Therefore, the reinforcing fiber preform can be properly impregnated with the second resin. In addition, the first resin can be used as the resin containing the filler. Accordingly, the prepreg 10 can be provided with a predetermined function. According to the above-described configuration, the prepreg 10 having a predetermined function can be produced by preferably impregnating the reinforcing fiber preform with the resin containing the filler 21.

In a second aspect, the first resin and the second resin are different resins.

According to this configuration, the first resin can be provided with a function different from that of the second resin which easily impregnates the reinforcing fiber preform.

As a third aspect, the first resin is the resin which shows a carbonization reaction.

According to this configuration, when the prepreg 10 is subjected to carbonization treatment such as burn-off treatment in a subsequent step, the prepreg 10 can be properly carbonized.

As a fourth aspect, in the step of disposing the first resin, the first resins are disposed on both sides of the reinforcing fiber preform and the second resin which are adjacent to each other, and one of the first resins disposed on both sides is the third resin which is the resin containing the first filler 31 and the first dispersant, and the other of the first resins disposed on both sides is the fourth resin which is the resin containing the second filler 32 and the second dispersant.

According to this configuration, the prepreg 10 can include the first filler 31 and the second filler 32 by using one of the first resins as the third resin and the other of the first resins as the fourth resin. Therefore, the prepreg 10 having a predetermined function can be produced by preferably impregnating the reinforcing fiber preform with the resin containing a plurality of types of the fillers 31 and 32.

According to a fifth aspect, there is provided the method for producing the prepreg 10 in which the prepreg 10 is produced by impregnating the reinforcing fiber preform (reinforcing fiber sheet 15) with the resin. The method includes a step of preparing the third resin which is the resin containing the first filler 31 and the first dispersion and the fourth resin which is the resin containing the second filler 32 and the second dispersant (Steps S11 to S14), a step of disposing the third resin to be adjacent to the reinforcing fiber preform (Step S15), a step of disposing the fourth resin to be adjacent to the reinforcing fiber preform on a side opposite to the third resin (Step S16), and a step of impregnating the reinforcing fiber preform with the third resin (Step S17).

According to this configuration, the reinforcing fiber preform can be easily impregnated with the third resin containing the first filler 31 by the first dispersant. In addition, the reinforcing fiber preform can be easily impregnated with the fourth resin containing the second filler 32 by the second dispersant. Therefore, the reinforcing fiber preform can be properly impregnated with the third resin and the fourth resin. In addition, the third resin can be used as the resin containing the first filler 31, and the fourth resin can be used as the resin containing the second filler 32. Accordingly, the prepreg 10 can be provided with a predetermined function. According to the above-described configuration, the prepreg 10 having a predetermined function can be produced by preferably impregnating the reinforcing fiber preform with the resin containing a plurality of types of the fillers.

As a sixth aspect, the third resin and the fourth resin are the same resin.

According to this configuration, the same resin can be used for impregnating the reinforcing fiber sheet 15 with the resin. Accordingly, homogenization can be achieved.

According to a seventh aspect, there is provided the method for molding the composite material in which the composite material is molded by using the prepreg 10 produced by the above-described method for producing the prepreg 10. The method includes Step S21 of laminating the prepreg 10, Step S22 of integrating the laminated prepregs 10 into the laminate, Step S23 of carbonizing the laminate, and Step S24 of impregnating the carbonized laminate with molten silicon to mold the composite material.

According to this configuration, the laminate can be preferably carbonized by using the prepreg 10 in which the reinforcing fiber preform is preferably impregnated the resin. Therefore, the composite material properly impregnated with the molten silicon can be molded.

REFERENCE SIGNS LIST

10: prepreg
15: reinforcing fiber sheet
17: impregnating resin sheet
19: functional resin sheet
21: filler
25: first functional resin sheet
26: second functional resin sheet
31: first filler
32: second filler

The invention claimed is:
1. A method for producing a prepreg in which the prepreg is produced by impregnating a reinforcing fiber preform with a resin, the method comprising:
    a step of preparing a first resin which is the resin containing a filler, and a second resin which is the resin without containing the filler;
    a step of disposing the second resin to be adjacent to the reinforcing fiber preform;
    a step of disposing the first resin to be adjacent to at least one of the reinforcing fiber preform and the second resin; and
    a step of impregnating the reinforcing fiber preform with the second resin, wherein
    in the step of disposing the first resin, the first resins are disposed on both sides of the reinforcing fiber preform and the second resin which are adjacent to each other, and
    one of the first resins disposed on both sides is a third resin which is the resin containing a first filler and a first dispersant, and the other of the first resins disposed on both sides is a fourth resin which is the resin containing a second filler and a second dispersant.

2. The method for producing a prepreg according to claim 1,
wherein the first resin and the second resin are different resins.

3. The method for producing a prepreg according to claim 2,
wherein the first resin is a resin which shows a carbonization reaction.

4. A method for molding a composite material in which the composite material is molded by using the prepreg produced by the method for producing a prepreg according to claim 3, the method comprising:
   a step of laminating the prepreg;
   a step of integrating the laminated prepregs into a laminate;
   a step of carbonizing the laminate; and
   a step of impregnating the carbonized laminate with molten silicon to mold the composite material.

\* \* \* \* \*